United States Patent [19]

Everett et al.

[11] Patent Number: 5,298,988
[45] Date of Patent: Mar. 29, 1994

[54] TECHNIQUE FOR ALIGNING FEATURES ON OPPOSITE SURFACES OF A SUBSTRATE

[75] Inventors: Patrick N. Everett, Concord; William F. Delaney, Millville, both of Mass.

[73] Assignee: Massachusetts Institute of Technology, Cambridge, Mass.

[21] Appl. No.: 893,191

[22] Filed: Jun. 2, 1992

[51] Int. Cl.$^5$ .............................................. H04N 07/18
[52] U.S. Cl. ..................................... 348/87; 356/373; 356/401; 430/311; 348/95
[58] Field of Search ........................ 358/101, 106, 107; 382/8; 430/311; 356/373, 401; H04N 7/18

[56] References Cited

U.S. PATENT DOCUMENTS

| | | | |
|---|---|---|---|
| 3,900,244 | 8/1975 | Wiesler | 358/107 |
| 4,448,522 | 5/1984 | Raush | 355/78 |
| 4,557,995 | 12/1985 | Broers et al. | 430/296 |
| 4,737,845 | 4/1988 | Susuki | 358/101 |

OTHER PUBLICATIONS

Diana Nyyssonen, "Practical Method For Edge Detection and Focusing For Linewidth Measurements on Wafers", Optical Engineering Jan. 1987 vol. 26 No. 1.

*Primary Examiner*—Howard W. Britton
*Attorney, Agent, or Firm*—Robert F. O'Connell

[57] ABSTRACT

A technique for aligning features on opposite surfaces of a substrate by generating a fiducial image at an image plane and identifying the location of the image at a viewing device remote therefrom, e.g., a video display screen. The substrate is placed so that one surface thereof, on which a feature is to be placed in alignment with a corresponding feature already present on the other oppositely disposed surface, is at the image plane. The one surface has photoresist material thereon. With the fiducial image turned off, an image of the feature on the other oppositely disposed surface is presented at the viewing device and the substrate is moved in the image plane until the image of the feature at the viewing device is at the previously identified location of the fiducial image. The fiducial image is then regenerated to mark its location in the photoresist material at the one surface of the substrate, such location then being in alignment with the corresponding feature on the other oppositely disposed surface thereof.

15 Claims, 4 Drawing Sheets

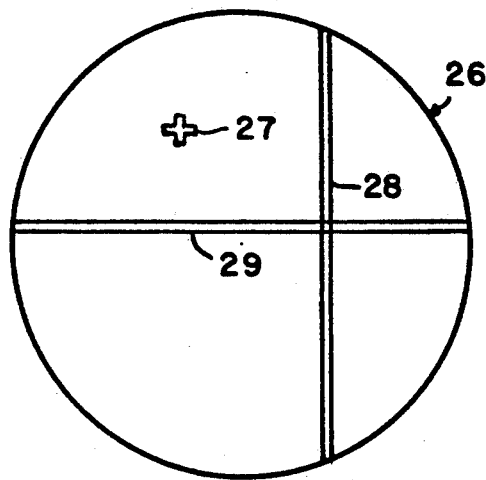
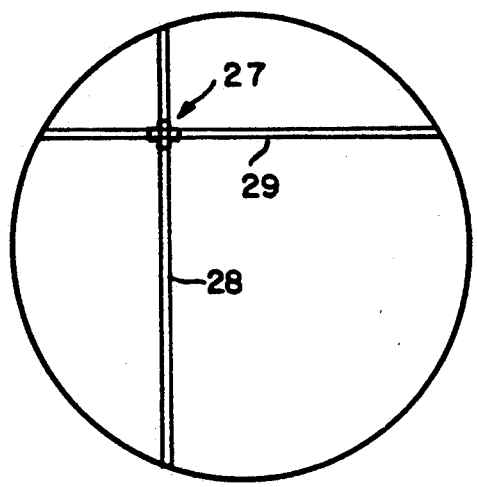
FIG.3    FIG.3A
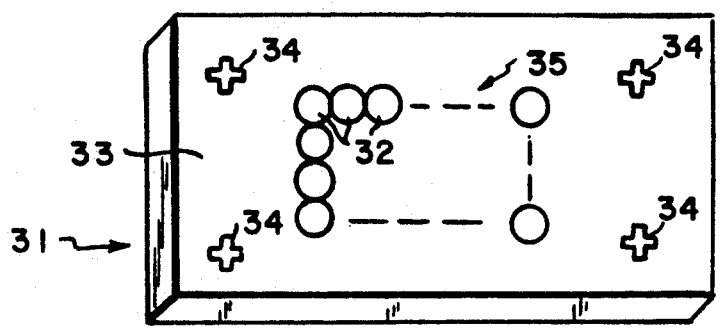
FIG.4
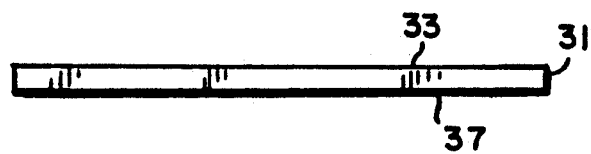
FIG.4A

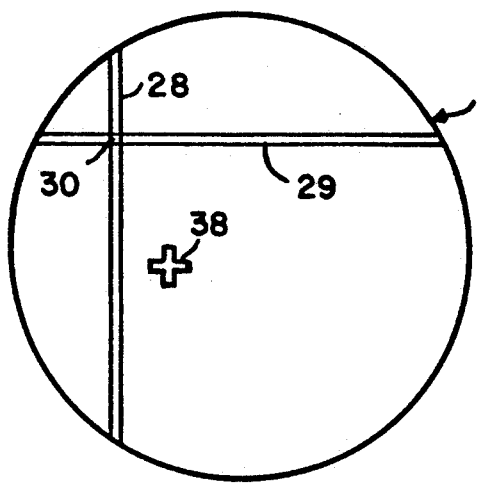
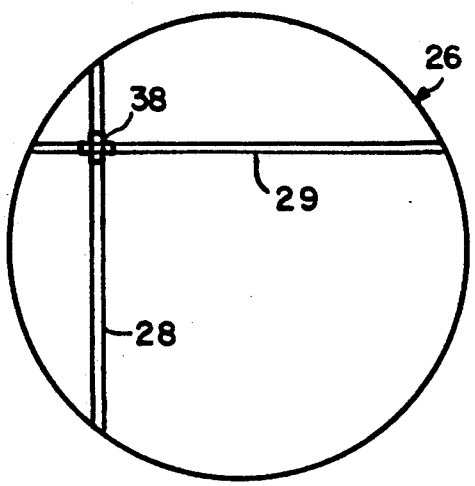
FIG.5  FIG.6
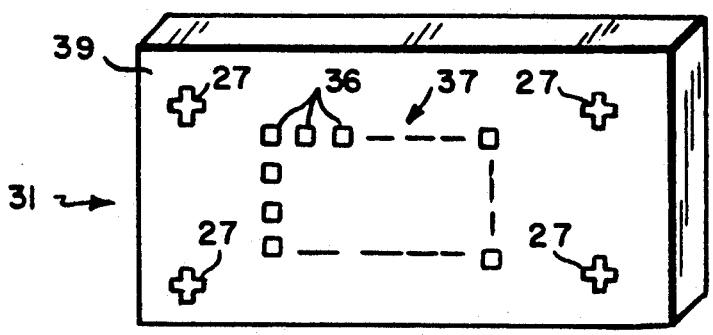
FIG.7A
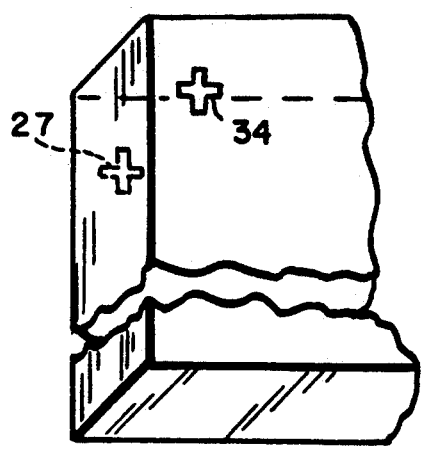
FIG.7

TECHNIQUE FOR ALIGNING FEATURES ON OPPOSITE SURFACES OF A SUBSTRATE

This invention was made with government support under contract Number F19628-85-C-0002 awarded by the Air Force. The government has certain rights in the invention.

INTRODUCTION

This invention relates generally to the alignment of features on opposite sides of a substrate and, more particularly, to a novel technique for providing such alignment which does not depend on the transparency of the substrate but can be performed with an opaque substrate.

BACKGROUND OF THE INVENTION

There is an increasing need for aligning features, such as features produced using photolithographic techniques, which features are to be positioned on opposite surfaces of a substrate. Such alignment can be required, for example, in manufacturing integrated circuits or optical elements, or combinations thereof. Current techniques for providing such alignment generally use one of two alternative techniques.

A first technique relies on the transparency of the substrates involved at the wavelengths used for alignment so that the alignment equipment in effect "looks through" the substrate, from one surface to the other, to align the oppositely disposed features thereon. In some cases, where the substrate is opaque in the visible part of the spectrum but is transparent in the infrared portion of the spectrum, the alignment equipment may be designed to use infrared wavelength signals. However, in such cases there is a loss in alignment precision because of the longer wavelengths involved and because the devices used therein are not optimized for operation at the longer wavelenths. This technique cannot be used in cases where the substrate is opaque in the portions of the spectrum that can be used for aligning (generally the visible or near infra-red).

A second technique, that is sometimes used, exposes the lithography simultaneously on both opposing surfaces. The equipment used therefor utilizes a mask for each surface, with the two masks accurately aligned before the substrate is introduced. This approach can handle opaque substrates, but the equipment is complex and expensive. In addition, it is restricted only to situations where it is practical to initiate the lithography on both surfaces simultaneously.

It is desirable then to develop a simple and relatively inexpensive technique which will provide alignment of oppositely disposed features using wavelengths, preferably in the visible part of the spectrum, whether or not the substrate is transparent or opaque at such visible wavelenths, and which allows lithography on one surface of a substrate to be aligned with existing lithography on the opposite surface.

BRIEF SUMMARY OF THE INVENTION

In accordance with a preferred embodiment of the invention, a fiducial is generated by a suitable fiducial generating device and is imaged at an image plane which corresponds to the plane of a microscope stage of a microscope system. The microscope thereof detects the imaged fiducial and supplies the detected image to a video monitor which displays the fiducial image on the display screen thereof. The position of the fiducial image on the screen is then marked thereon, as by the intersection of a pair of movable, orthogonal electronic filars available on the display. The fiducial generator can then be turned off and a substrate is placed on the microscope stage.

The substrate contains, for example, one or more reference marks positioned on one surface, i.e., the top surface thereof, and it is desired that corresponding reference marks be placed on the opposite surface, i.e., the bottom surface thereof, so that the latter reference marks are aligned with the former reference marks. The features on the top surface are at known positions relative to such reference marks. In further accordance with the invention, the bottom surface of the substance is coated with a photoresist material and, when the substrate is placed on the microscope stage, the plane of such bottom surface coincides with the plane of the microscope stage.

The microscope is then focused on the top surface of the substrate and an image of one of the reference marks thereon is displayed on the display screen of the video monitor. The substrate is then moved in the plane of the microscope stage until such reference mark image coincides with the intersection of the electronic filars. The fiducial generator then is energized to regenerate the fiducial image at the plane of the microscope stage, which fiducial image then becomes marked in the photoresist material on the bottom surface of the substrate. Such fiducial marking on the bottom surface corresponds to the above reference mark on the top surface and is automatically aligned with such top surface reference mark. The same procedure can then be utilized to provide other fiducial marks on the bottom surface each of which corresponds to, and is aligned with, one of the other reference marks on the top surface. Using all of such reference marks, the features the positions of which relative thereto are known, can be accurately placed on the bottom surface of the substrate so that the alignments thereof, with respect to the corresponding features on the top surface of the substrate, are achieved. In general only a small number of references marks (e.g., typically four) are needed to provide a frame of references for correctly aligning a lithographic mask for the subsequent lithographic steps on the bottom surface.

DESCRIPTION OF THE INVENTION

The invention can be described in more detail with the help of the accompanying drawings wherein FIG. 1 shows a block diagram of a particular exemplary embodiment of a system in accordance with the invention;

FIGS. 3 and 3A show plan views of a display for viewing and identifying the location of a fiducial thereon;

FIGS. 4 and 4A show perspective and side views, respectively, of an exemplary substrate having reference marks and feature elements on one surface thereof;

FIGS. 5 and 6 show plan views or a display for viewing and identifying the location of a reference mark thereon;

FIGS. 7 and 7A show perspective views of the surface of the substrate opposite the surface thereof depicted in FIG. 4 which views depict reference marks and feature elements thereon;

Figure 1:
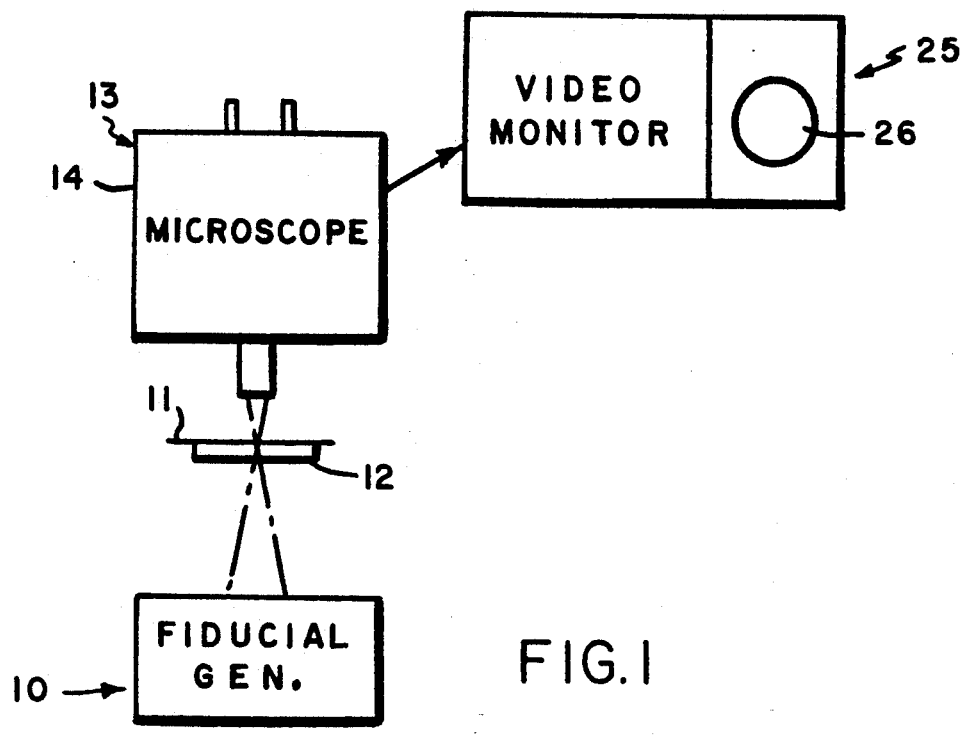

As can be seen in FIG. 1, a fiducial generator 10 is positioned so that its imaging plane 11 coincides with the plane of a microscope stage 12 of a microscope system 13 mounted above the fiducial generator. The fiducial generator, or projector 10, can be constructed from standard commercial microscope parts as shown in FIG. 2, for example.

Figure 2:
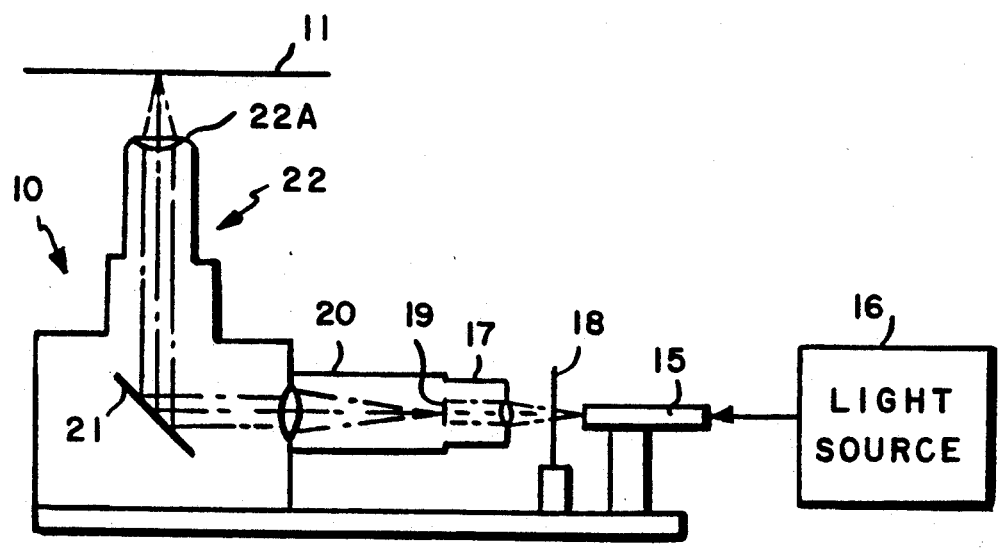
FIG. 2 shows a diagrammatic view of an exemplary embodiment of the fiducial generator depicted in FIG. 1.

As seen in FIG. 2, the fiducial generator 10 includes an optical fiber 15 for carrying light from an illuminating source 16, the light being transmitted to an eyepiece 17, e.g., such as a standard microscope eyepiece having a 10× objective, via a filter 18. Other illumination techniques for the fiducial generator can also be used as would be well-known to those in the art. A suitably configured reticle 19 for forming a fiducial is positioned at the end of eyepiece 17, the light from recticle 19 representing a fiducial thereupon being collimated and transmitted through a tubular lens 20 to a reflective mirror 21. The collimated light representing the fiducial is then projected through a projector lens 22. For spatial convenience in the embodiment depicted the collimated light is reflected at a 90° angle from mirror 21 for projection through projector lens 22 which focuses an image of the fiducial at the imaging, or object, plane 11. The distance between the tubular lens 20 and the projector lens 22 is not necessarily optically critical since the light is collimated.

The assembly for projecting the alignment fiducial upwardly into the plane of the microscope stage can be constructed, for example, of standard parts, such as made by Ernst Leitz Wetzlar Gmbh of Germany, and sold by Kenneth A. Dawson Co., Inc. of Belmont, Mass. The principal components are designated as:

| Model No. | Part |
|---|---|
| 563 486 | Modular Pack IX assembly with tube lens and beam splitter |
| 512 736 | Monotube assembly |
| 376 102 | Eyepiece adaptor |
| 519 750 | 10× focussable eyepiece with 19 mm reticle mount |
| KD21290C | Focus drive |
| 553 290<br>553 303<br>569 231 | Spacers |
| 2761 | 2× Extender doubler lens for video camera |
| KD21590 | C-Mount extender |
| KD21290A | Modification of certain above listed parts, as per the modified specification set forth below |
| 549 026 | Leitz projector objective with variable f number |

In the modification of parts designated by Model No. KD21290A above, the length of the monotube is reduced by 0.375", and the eyepiece adaptor is modified to use a set screw for holding the eyepiece, with the top half shortened by 1.457" to permit access of the eyepiece focus and the eyepoint for positioning of the electronic shutter. An "L" bracket was fabricated to attach the 1× modular pack assembly to the right angle mirror housing combined with a spacer block to mount the assembly to the horizontal tooling plate. The top plate for the mirror housing has a center hole having RMS objective threads, and oversized corner mounting holes, for an initial gross alignment of the objective to the mirror, and the horizontal tooling plate had dimensions of 5.5×15×0.375 inches using Newport mounting holes every inch on the long sides, as well as tapped holes at one end for mounting the mirror housing. Leitz parts are chosen, for example, because they use an infinity corrected optical system that makes the design more practical and economical.

The microscope stage used was an unusually high-quality x-y stage, obtained from Nikon Corporation of Japan. The stage is arranged so as to be stable with minimum pitch and yaw when the traversing knobs are operated, and must operate as smoothly as possible. A platen fabricated therefor, consisting of a disk with a hole through it, was made to fit in the stage so as to support the substrate. The hole in the platen was made large enough to allow the fiducial light to pass therethrough and to impinge upon the underside of the substrate. Adhesive teflon tape was applied to the top surface of the platen to minimize the possibility of damaging the substrate. It was found that gravity is normally sufficient to hold the substrate in position. A useful modification for lighter weight substrates would be to add a vacuum chuck or other holding device thereto to maintain the substrate in position.

While the above assembly has been specifically described as effective for use in accordance with the invention, other assemblies may be devised and fabricated for the purpose by those in the art to provide the positioning and movement accuracies required.

The microscope system 13 includes a suitable high quality, microscope 14, such as the readily available Nikon Trinocular microscope, made by Nikon Corporation of Japan and sold, for example, by Donsanto Corporation of Natick, Mass. assembled from the following parts designated:

| Model No. | Part |
|---|---|
| 84214 | Trinocular body |
| 76408 | Modular focus mount |
| 79144 | 1-piece nose piece |
| 79295 | 10× microscope objective |
| 84220 | CFDW eyepiece |
| 79500 | Illuminator |
| 79501 | Lamphour |
| 76576 | Transformer |
| 79034 | C-mount |

The microscope may use an eyepiece with a 10× objective, for example, for viewing purposes. The microscope is mounted on a sturdy stand which allows for a fine adjustment of its position relative to the fiducial generator and for a precise adjustment of its vertical axis. To preserve the required stability of adjustments it is recommended that a fixed microscope objective be used rather than one having a commonly used rotary holder for allowing selection of the objective.

In a particular embodiment a video monitor system 25 is used with the microscope system 13 for generating video images of elements viewed by the microscope for display of such images on a display screen 26 thereof. The video monitor can use, for example, a 5× tubular lens, a 2× magnifier and a CCD camera, the camera having a 1000× magnification, to produce images for display, in a manner as would be well-known to those in the art. The display screen includes movable, orthogonally intersecting electronic filars, as further discussed below. An example of a usable video measuring system is one made and sold by Boeckeler Instruments Inc., of Tucson, Ariz., under the model designation V1A100K.

During operation, in order to provide for the aligning of feature elements on one side of a substrate with corresponding feature elements on the opposite side thereof, the fiducial generator 10 projects a fiducial image onto imaging plane 11 and microscope 14 of microscope system 13 is focused on, and detects, the fiducial image at plane 11. As mentioned above, the imaging plane 11 is arranged to coincide with the plane of the stage 12 of microscope 13. The objective lens 22A of projector lens 22 is provided with a fine focussing adjustment to allow the accurate focussing required. Various methods are known to the art for ensuring that the best image is obtained at the plane of the stage 12 which will later be the plane of the photoresist layer 37 on the under-surface of the substrate 31, as shown in FIG. 4A.

An image of the fiducial which has been so detected by the microscope is then displayed on the display screen 26 of video monitoring system 25, as shown by fiducial image 27 in FIG. 3. A pair of intersecting electronic filars 28 and 29 are then movably positioned on the screen so the intersection region 30 thereof coincides with the fiducial image 27, as shown in FIG. 3A. When the filars are correctly positioned, they are maintained at such positions and the fiducial generator is then turned off.

A substrate 31 having one or more feature elements 32 and one or more reference marks 34 on one surface 33 (e.g., a top surface) thereof is shown in FIG. 4. The feature elements 32 have known positions relative to the positions of reference marks 34 on surface 33, as depicted in FIG. 4. For example, the feature elements 32 may be an array 35 of binary lenslets, as shown in the figure, there being four reference marks 34 formed at known positions relative thereto, e.g., at specifically known positions adjacent each of the four corners of array 35. It is desired, in this example being discussed, to form an array of feature elements, such as an array of apertures, in the bottom surface of substrate 31 in a manner such that each aperture corresponds to, and is aligned with, a lenslet of the array 35.

The substrate 31 has a thin layer 37 of photoresist material deposited on the bottom surface thereof, as shown in FIG. 4A, and the substrate is then placed on the microscope stage so that the plane of the bottom surface of substrate 31, i.e., the plane of the photoresist layer, coincides with the plane of the microscope stage.

The microscope is then focused on a selected one of the reference marks 34 at the top surface of substrate 31 and an image 38 thereof is displayed on the display screen 26 of video monitor 25, as shown in FIG. 5. The image 38 will generally be offset from the intersection region 30 of the previously positioned electronic filars on screen 26, as shown in FIG. 5. The microscope stage is moved only in the plane thereof (i.e., it is constrained from moving vertically) to a position such that the image 38 of the selected reference mark is caused to coincide with the intersection region 30 of the filars, as shown in FIG. 6. The microscope stage, and hence the substrate 31, is then maintained at such position.

The fiducial generator is turned on so that the fiducial image 27 is again projected on to the photoresist material at the bottom surface of substrate 31. The location, on the bottom surface of the substrate, of the projected image 27, which is thereupon exposed into the photoresist material, corresponds to, and is automatically aligned with, the above selected reference mark 34 on the top surface of the substrate, as shown in FIG. 7. Accordingly, an image of the fiducial 27 is present in the photoresist material at a position which is correctly aligned with the position of the reference mark 34.

With the fiducial generator turned off, the microscope is then re-focused (traversing the microscope stage as necessary) on to a second selected reference mark 34 on the top of substrate 31 and its image is displayed on the display screen of the video monitor. The microscope stage is again moved to a position such that such image is caused to coincide with the intersection of the electronic filars on the display screen. The fiducial generator is again turned on and the fiducial image is projected for exposure in to the photoresist material at a position on the bottom surface of substrate 31 which thereupon corresponds to, and is aligned with, the second selected reference mark on the top surface thereof. Each of the remaining reference marks on the top surface of substrate 31 are successively handled in the same manner until all of the reference marks have a corresponding, aligned fiducial which is exposed in the photoresist material on the bottom surface.

Once the bottom surface has been so prepared, a suitable pre-formed mask having corresponding reference marks correctly positioned therein, as well as the correct positions of the desired feature elements relative thereto, can be used so that the exposed fiducial marks in the substrate are matched to the mask reference marks on the mask. The mask can then be used to reproduce the desired array of feature elements on the bottom surfaces of the substrate. For example, once the matching of reference marks on the mask with fiducial reference marks 27 on the substrate occurs, an array 37 of apertures 36 can be formed on the bottom surface 39 to correspond to the array 35 of lenslets 32 on the top surface of substrate 31, as shown in FIG. 7A.

In using the above described technique the vertical motion of the microscope must be precisely perpendicular to the plane of the microscope stage on which the substrate is placed. Accordingly, the vertical axis of the microscope must be suitably adjusted so as to assure that such precisely perpendicular vertical motion is achieved. One technique for making such adjustment can be used as follows.

Figure 9:
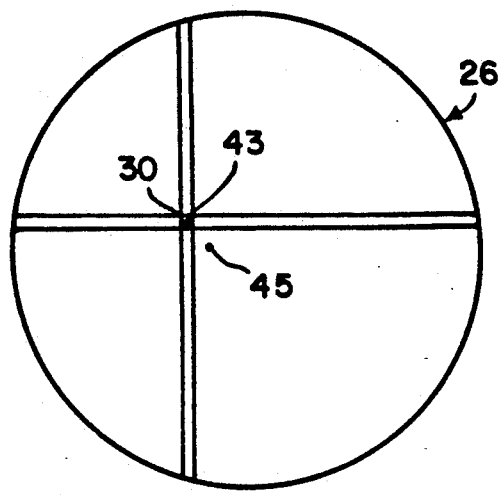
FIG. 9 shows a plan view of a display of a dust speck and a reflected dust speck on the top surface of the glass substrate of FIG. 8.
Figure 8:
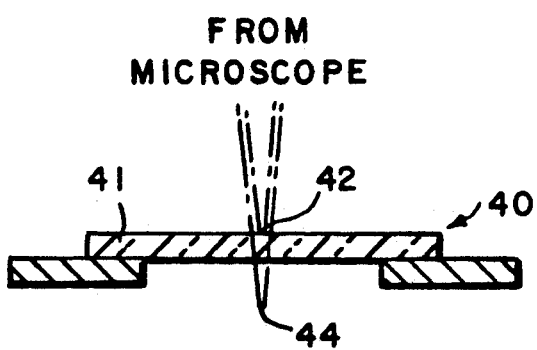
FIG. 8 shows a glass substrate having a reflective coating on the lower surface for use in an embodiment of the invention.

A glass substrate 40 having precisely parallel top and bottom planar surfaces has a reflective coating 41 (mirror) on the lower surface thereof, reflecting upwardly through the substrate, as shown in FIG. 8. The substrate is placed on the microscope stage 12 so that the bottom reflective surfaces rests at the plane of the microscope stage. The microscope is then focused on a small speck 42 of dust on the top surface (e.g., a speck perhaps about 1.0 μ.m. in diameter) and an image 43 thereof is displayed on the display screen 26 of video monitor 25, the microscope stage being traversed so that the image 43 is centered on the intersecting electronic filars on the screen at region 30 thereof, as shown in FIG. 9. The microscope is then refocused on the reflected image 44 of the dust speck, i.e., beneath the bottom mirrored surface of the substrate. The reflected image 45 is then displayed on the display screen. If the reflected dust speck image, as shown exaggerated in FIG. 9, does not coincide with the intersecting region 30 of the filars (i.e., with the position of the previously displayed direct dust speck image 43), the microscope's vertical motion is not truly perpendicular, as desired. The position of the microscope's vertical axis, on the plane of the microscope stage, is then adjusted until vertical motion is correct, i.e., until the positions of the direct image 43 and the reflected image 45 of the dust speck coincide on the screen when the above described procedure is repeated. The microscope adjustments that might affect the integrity of this adjustment are then suitably locked securely in place to prevent any subsequent misadjustment thereof due to accidental contacts therewith.

In order to further check the alignment accuracy of the plane of the microscope stage 12, i.e., that its motion in a plane is truly perpendicular to the microscope vertical axis, the bottom surface of the substrate with a fiducial image thereon can be half-exposed initially on stage 12. The substrate on the microscope stage is rotated in the plane of the microscope stage by 180°, re-aligned, (and is realigned in accordance with the above alignment procedures) and the fiducial again half-exposed. If the plane of the motion of the stage is accurate, there will be no significant offset between the fiducials in the first and second exposures. So long as the offset is less than 1.0 $\mu$.m. for example, the apparatus should be effective for use. If the offset is larger, the mid-point of the offset fiducial images can then be used for subsequent alignment, the spread therebetween indicating the extent of any system error, the amount thereof being used as a correction factor.

While the above described embodiment uses a video display technique using electronic filars on a display screen, in an alternative embodiment, such a video system need not be used and a user may utilize the microscope itself for direct viewing of images, a pair of mechanically driven filars being used in the eyepiece of the microscope. The observer then performs the appropriate operations while directly viewing the images involved at the eye-piece itself which provides displays for a viewer substantially similar to those shown in FIGS. 3 and 3A and FIGS. 5 and 6.

While the above description of the invention discloses preferred embodiments thereof, modification thereof may occur to those in the art within the spirit and scope of the invention. Hence, the invention is not to be construed as limited to the particular embodiments described, except as defined by the appended claims.

What is claimed is:

1. A method for providing alignment of one or more elements on opposite surfaces of a substrate comprising the steps of
    generating a fiducial image at an image plane;
    displaying a video image of said fiducial on a display screen;
    identifying the location of the video image of said fiducial on said display screen;
    placing at said image plane a substrate having one or more elements on one surface thereof and having a photoresist material on the opposite surface thereof, said opposite surface lying in said image plane;
    displaying a video image of one of said one or more elements on said display screen;
    moving said substrate in said image plane until the video image of said one of said one or more elements is located on said display screen at the identified location of the video image of said fiducial;
    re-generating the fiducial image at said image plane so that the location of said fiducial image is marked in said photoresist material, the location of the fiducial image marked in said photoresist material on said opposite surface corresponding to, and being aligned with, the location of said one element on said one surface of said substrate.

2. A method in accordance with claim 1 wherein the fiducial image at said image plane is removed after the location of the video image thereof is identified.

3. A method in accordance with claim 1 wherein said one element is a reference element on said one surface of said substrate.

4. A method in accordance with claim 1 wherein said one element is a feature element on said one surface of said substrate.

5. A method in accordance with claim 1 and further repeating the steps thereof with respect to a plurality of elements on said one surface of said substrate so as to mark the locations in said photoresist material of a plurality of fiducials corresponding to, and aligned with, said plurality of elements.

6. A method in accordance with claim 5 wherein said plurality of elements include a plurality of reference marks having known locations on said one surface of said substrate relative to one or more feature elements on said one surface, so that when the locations of said plurality of fiducials correspond to, and are aligned with said reference marks, the locations of feature elements on said opposite surfaces corresponding to, and aligned with, the feature elements on said one surface can be identified.

7. A method for providing alignment of one or more elements on opposite surfaces of a substrate comprising the steps of
    generating a fiducial image at an image plane;
    viewing an image of said fiducial;
    identifying the location of said viewed image of said fiducial;
    placing at said image plane a substrate having one or more elements on one surface thereof and having a photoresist material on the opposite surface thereof, said opposite surface lying in said image plane;
    viewing an image of one of said one or more elements;
    moving said substrate in said image plane until the viewed image of said one of said one or more elements is located at the identified location of the viewed image of said fiducial;
    re-generating the fiducial image at said image plane so that the location of said fiducial image is marked in said photoresist material, the location of the fiducial image marked in said photoresist material on said opposite surface corresponding to, and being aligned with, the location of said one element on said one surface of said substrate.

8. A method in accordance with claim 7 wherein the image of said fiducial and the image of said one or more elements are viewed directly at the eyepiece of a microscope.

9. A method in accordance with claim 8 wherein the location of the viewed image of said fiducial is identified using mechanical filars at said eyepiece.

10. A system for aligning one or more elements on opposite surfaces of a substrate comprising
    a microscope having a microscope stage;
    a fiducial generator for generating a fiducial image at an image plane coinciding with the plane of said microscope stage;

a video imaging and display means, having electronic filars;

said microscope responding to said fiducial image for supplying said fiducial image to said video imaging and display means to provide a video image of said fiducial on said display means, said electronic filars identifying the location of said video fiducial image;

said microscope supplying an image of an element on one surface of said substrate when said substrate having a photoresist material on the opposite surface of said substrate is placed on said microscope stage, the image of said element being displayed on said display means;

means for moving said substrate on said microscope stage until the location of the video image of said element coincides with the identified location of the video image of said fiducial on said display means;

re-generating the fiducial image at said image plane whereby the location of said fiducial is marked in said photoresist material on the opposite surface of said substrate and corresponds to, and is aligned with, the element on the one surface of said substrate.

11. A system in accordance with claim 10 wherein said substrate has one or more reference marks having known positions relative to one or more feature elements on one surface thereof, said system providing one or more fiducials marked in said photoresist material at locations corresponding to said one or more reference marks whereby the positions of said feature elements in said opposite surface relative to said reference mark locations is known.

12. A system in accordance with claim 10 wherein said microscope is mounted so as to move vertically so that its movement is perpendicular to the plane of said microscope stage.

13. A system for aligning one or more elements on opposite surfaces of a substrate comprising
a microscope having a microscope stage;
a fiducial generator for generating a fiducial image at an image plane coinciding with the plane of said microscope stage;
means for viewing images at the plane of said microscope stage;
said microscope responding to said fiducial image to provide a viewed image of said fiducial at said viewing means, said viewing means including means for identifying the location of said viewed fiducial image.
said microscope supplying an image of an element on one surface of said substrate when said substrate having a photoresist material on the opposite surface of said substrate is placed on said microscope stage, the image of said element being viewed at said viewing means;
means for moving said substrate on said microscope stage until the location of the viewed image of said element at said viewing means coincides with the identified location of the viewed image of said fiducial at said viewing means;
re-generating the fiducial image at said image plane whereby the location of said fiducial is marked in said photoresist material on the opposite surface of said substrate and corresponds to, and is aligned with, the element on the one surface of said substrate.

14. A system in accordance with claim 13 wherein microscope has an eyepiece and said viewing means is the eyepiece of said microscope.

15. A system in accordance with claim 14 wherein said location identifying means comprises mechanical filars at said eyepiece.

* * * * *